Feb. 3, 1953
M. P. DEPUTY
2,627,329
PLURAL POWER FEED AND BRAKE OPERATING MECHANISM FOR MOTOR VEHICLES
Filed Oct. 13, 1950
4 Sheets-Sheet 1
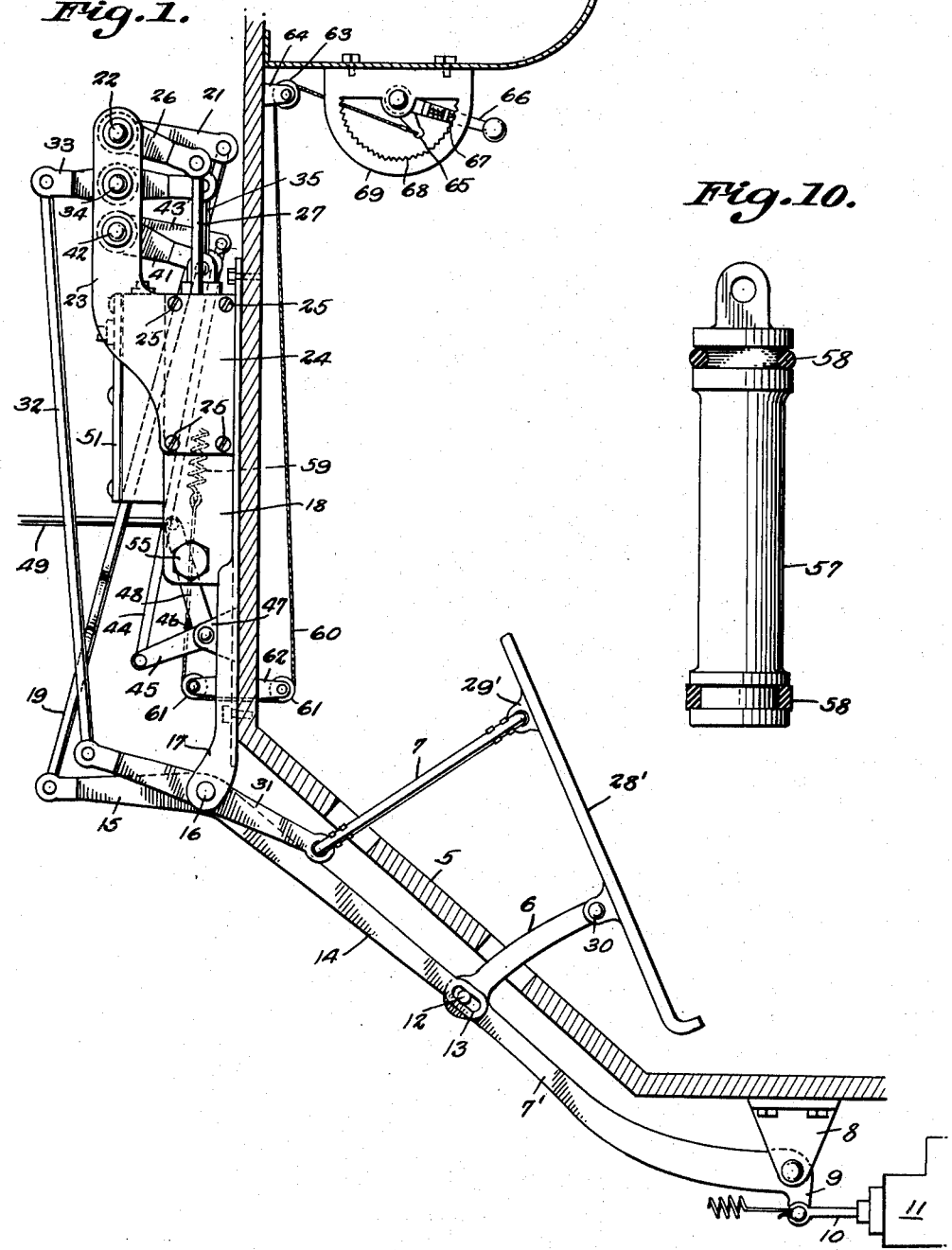
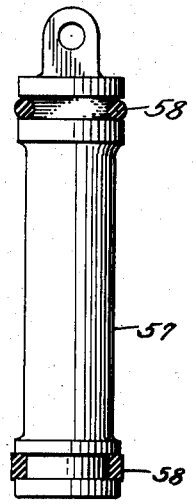
M. P. Deputy
INVENTOR
BY C. A. Snow & Co.
ATTORNEYS.

Feb. 3, 1953 — M. P. DEPUTY — 2,627,329
PLURAL POWER FEED AND BRAKE OPERATING
MECHANISM FOR MOTOR VEHICLES
Filed Oct. 13, 1950 — 4 Sheets-Sheet 2
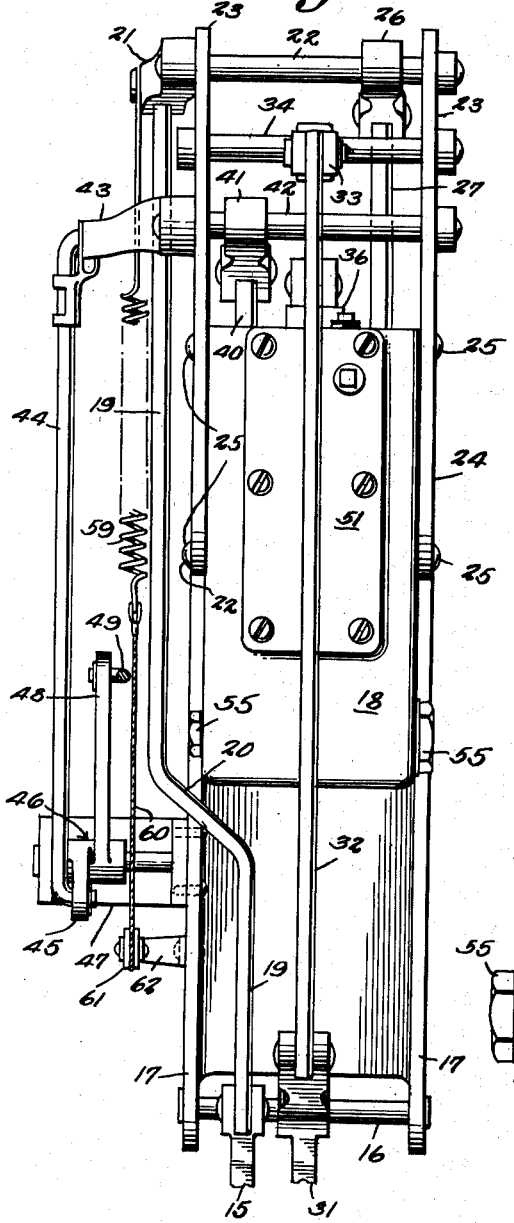
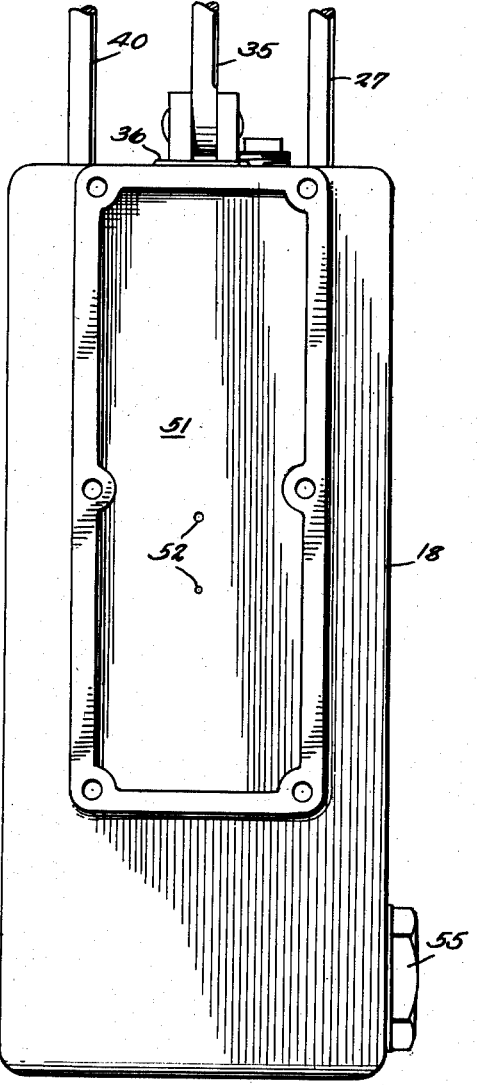
M. P. Deputy
INVENTOR
BY *C. A. Snow & Co.*
ATTORNEYS.

Feb. 3, 1953

M. P. DEPUTY 2,627,329

PLURAL POWER FEED AND BRAKE OPERATING
MECHANISM FOR MOTOR VEHICLES

Filed Oct. 13, 1950

M. P. Deputy
INVENTOR

BY C. A. Snow & Co.
ATTORNEYS.

Feb. 3, 1953
M. P. DEPUTY
2,627,329
PLURAL POWER FEED AND BRAKE OPERATING
MECHANISM FOR MOTOR VEHICLES
Filed Oct. 13, 1950
4 Sheets-Sheet 4
*Fig. 7.*
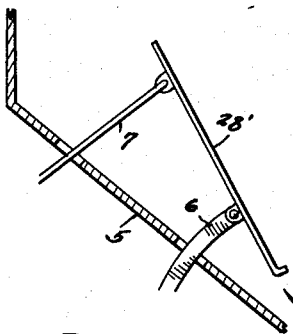
Inactive.
*Fig. 8.*
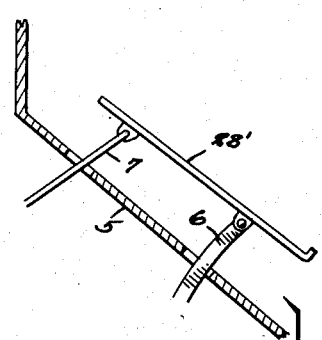
Throttle open.
*Fig. 9.*
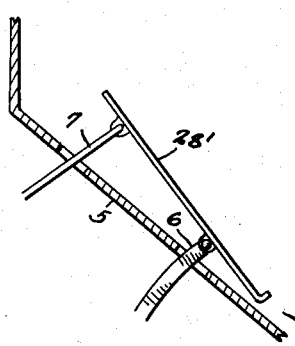
Brake applied.
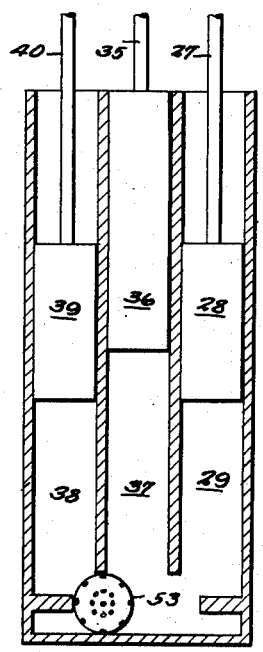
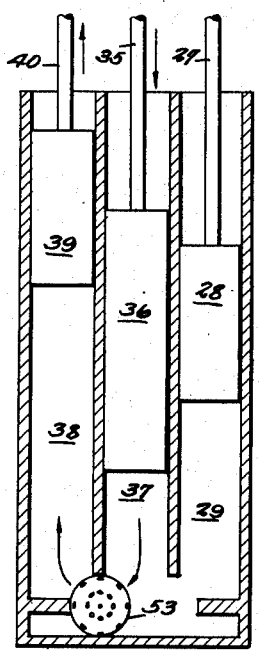
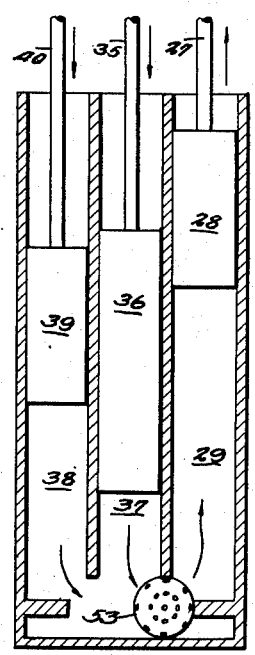
M. P. Deputy
INVENTOR
BY *C. A. Snow & Co.*
ATTORNEYS.

Patented Feb. 3, 1953

2,627,329

UNITED STATES PATENT OFFICE 2,627,329

PLURAL POWER FEED AND BRAKE OPERATING MECHANISM FOR MOTOR VEHICLES

Marshall P. Deputy, Council Bluffs, Iowa, assignor to Uni-Drive Corporation, Omaha, Nebr.

Application October 13, 1950, Serial No. 189,931

7 Claims. (Cl. 192—3)

1

This invention relates to a plural gas feed and brake operating mechanism for motor vehicles, the primary object of the invention being to simplify the control and operation of a motor vehicle, by eliminating the foot brake pedal, which forms a part of the conventional motor vehicle construction.

An important object of the invention is to provide means whereby the brakes of the vehicle to stop or retard movement of the vehicle, are applied by the operation of the accelerator pedal of the motor vehicle, thereby eliminating the time element involved when removing the foot from the accelerator pedal to a brake pedal.

Still another object of the invention is to provide means for automatically operating the throttle valve to reduce the speed of the engine to idling speed, simultaneously with the operation of the accelerator pedal to apply the brakes.

Another important object of the invention is to provide means actuated by the accelerator pedal of a motor vehicle for controlling and actuating the conventional braking mechanism of a vehicle, thereby appreciably reducing the time element in stopping a vehicle moving at a given speed, over a measured distance.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a side elevational view of an apparatus constructed in accordance with the invention, illustrating the apparatus as mounted on the floor board of a motor vehicle.

Fig. 2 is a front elevational view of the apparatus.

Fig. 3 is an elevational view of the apparatus or body portion, the cover of the fluid reservoir of the apparatus having been removed.

2

Figure 6:
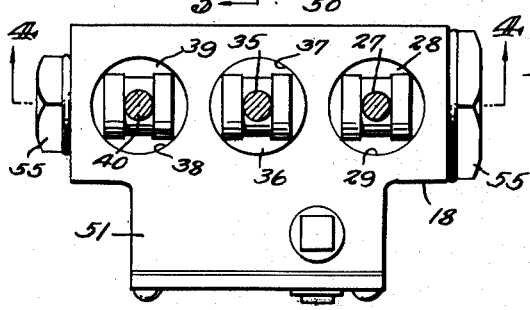

Fig. 6 is a plan view of the body portion of the device with the piston rods shown in section.

Fig. 7 is a diagrammatic view illustrating the normal position of the accelerator pedal, and corresponding normal positions of the pistons in the cylinders of the device.

Fig. 8 is a diagrammatic view illustrating the position of the accelerator and corresponding positions of the pistons in their cylinders during the application of gas.

Fig. 9 is a diagrammatic view illustrating the position of the accelerator pedal and relative positions of the pistons in their cylinders when the brake is applied.

Fig. 10 is an elevational view of a modified form of piston used in the device.

Referring to the drawings in detail, the reference character 5 indicates the floor board of a motor vehicle, the floor board being provided with openings through which the arm 6 and rod 7 extend, the arm 6 being formed integral with the brake lever 7' which is pivotally mounted on the bracket 8 bolted to the under side of the floor board of the vehicle, as clearly shown by Fig. 1 of the drawings. Extending from the pivoted end of the brake lever 7', is the short arm 9 to which the piston rod 10 of the master cylinder 11 is connected, so that movement of the brake lever 7' will operate to control the movements of the brakes not shown, and which are indirectly operated by the master cylinder 11. Extending laterally from the brake lever 7', and disposed at a point adjacent to the upper end thereof, is the pivot pin 12 that moves in the elongated opening 13, formed at the lower end of the lever 14, which lever 14 is provided with a forwardly extended arm 15, the lever 14 being pivotally mounted on the shaft 16. The shaft 16 is mounted in bearing openings formed at the lower ends of the brackets 17 which are arranged in parallel spaced relation with respect to each other, and disposed along the side edges of the body portion 18 of the device.

Connected with the forwardly extended arm 15, is the rod 19 which is offset at 20 so that the major portion of the rod 19 extends along one side edge of the body portion 18, as shown by Fig. 2. The rod 19 has pivotal connection with the arm 21 which in turn is secured to the shaft 22 that operates in bearings formed in the upstanding end portions 23 of the plates 24 that are secured to the sides of the housing 18, as by means of the screws 25. Also secured to the shaft 22, is the arm 26 to which the rod 27 is pivotally connected, the rod 27 having connection with the piston 28 operating in the cylinder 29 of the cylinder block.

The rod 7 connects with the accelerator pedal 28' at 29' adjacent to the toe portion thereof, while the arm 6 of the brake lever 7', connects with the accelerator pedal 28' near the heel portion thereof, the pivotal connection between the accelerator pedal and arm 6 being indicated by the reference character 30.

The rod 7 has pivotal connection with one end of the arm 31, which arm 31 is pivotally mounted on the shaft 16, one end of the arm 31 having pivotal connection with the rod 32 that extends upwardly and connects with the rocker arm 33 pivotally mounted on the shaft 34 mounted in bearings formed in the upstanding ends 23 of the plates 24. This rocker arm has one of its ends pivotally connected with the rod 35 which connects with the piston 36 that moves in the central cylinder 37. The cylinder assembly also includes the cylinder 38 in which the piston 39 operates, the piston 39 being connected with the rod 40 that has pivotal connection with the arm 41 secured to one end of the shaft 42 which is also mounted in bearings formed in the upstanding ends 23 of the plates 24. Secured to the shaft 42, is the arm 43 to which the rod 44 is connected, the rod 44 being pivotally connected with the arm 45 of the bell crank lever 46 which is pivotally mounted on the bracket 47. The arm 48 of the bell crank lever 46 has pivotal connection with the accelerator rod 49 that extends forwardly and connects with the throttle valve of the motor, not shown.

Figure 4:
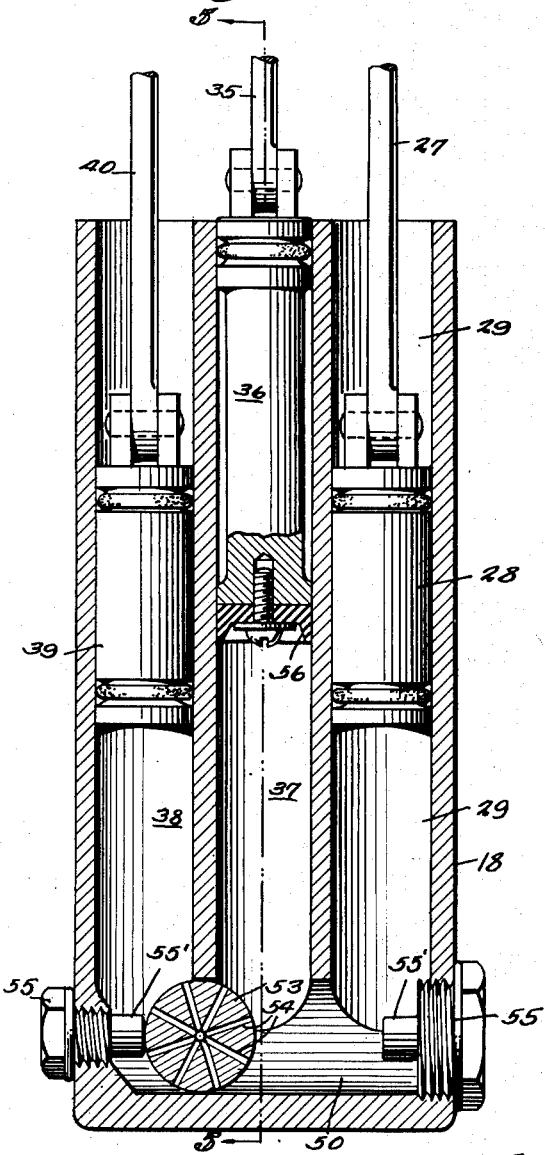
Fig. 4 is a longitudinal sectional view through the cylinder and piston assembly of the control mechanism of the device, taken on line 4—4 of Fig. 6.
Figure 5:
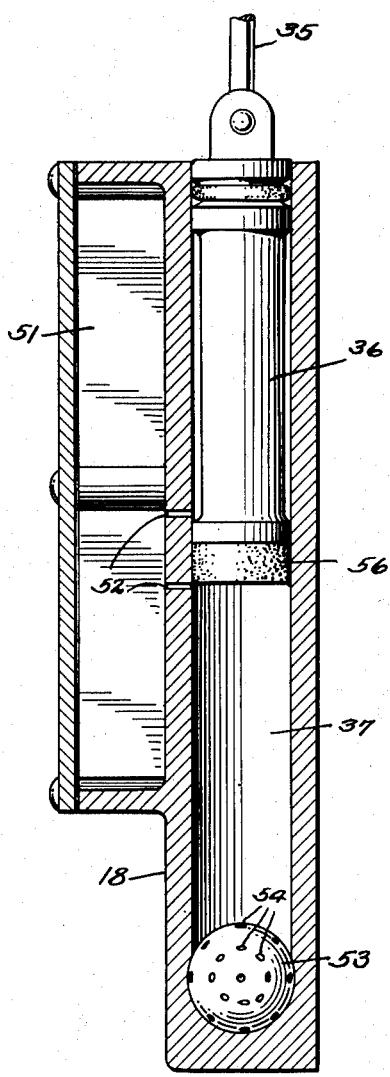
Fig. 5 is a sectional view taken on line 5—5 of Fig. 4.

As clearly shown by Fig. 4 of the drawings, the cylinders 29, 37 and 38 communicate with each other, through the passageway 50 disposed at the lower ends of the cylinders, the cylinder 37 being in communication with the fluid reservoir 51 mounted at one side of the cylinder block, through the openings 52 so that a predetermined quantity of fluid is maintained in the cylinders at all times, to insure the proper operation of the device.

The reference character 53 indicates a ball valve which is provided with a plurality of bores 54 which extend therethrough, the bores providing passageways for the fluid contained in the cylinders, to pass through the ball valve from one cylinder to another, according to the direction of force.

Closing each end of the passageway 50, is a threaded plug 55, the plugs 55 having extensions 55' that provide stops against which the ball valve 53 moves to limit the movement of the ball valve.

In the preferred form of the invention, I have shown the piston 36 provided with the usual cup washers 56. However it is to be understood that pistons such as indicated at 57 in Fig. 10 of the drawings may be provided, wherein packing rings 58 are fitted in grooves at the ends of the piston to provide a fluid tight connection between the piston and wall of its cylinder.

Secured to the arm 21, is the coiled spring 59 which has connection with the cable 60 that moves over the pulley 61 mounted on the ends of the stationary arm 62, the cable 60 also operating over the pulley 63 mounted in the bracket 64, from where the pulley connects with the arm 65 of the lever 66. This lever 66 is provided with a sliding pawl 67 that moves against the teeth 68 of the quadrant 69 which is secured preferably under the instrument board of the vehicle where it may be easily accessible by the operator. This spring 59 is designed to exert a downward pull on the arm 21, and consequently operate to swing the lower end of lever 14 towards the floor board 5, tensioning the movements of the accelerator. Due to this construction, it will be obvious that the tension on the accelerator pedal 28' may be regulated to meet various requirements of use for the convenience of the operator. It will also be noted that due to this spring structure, an exceptionally sensitive accelerator pedal operation may be insured.

In operation, assuming that the engine of the motor vehicle is idling, and the accelerator pedal 28' is in the position as shown by Fig. 7 of the drawings, by pressing the accelerator pedal 28' downwardly at the toe end thereof, the rod 7 is moved downwardly, rocking the arm 31, moving the rod 32 upwardly which in turn actuates the rocker arm 33 moving the rod 35 and piston 36 downwardly. As the piston 36 moves downwardly against the column of fluid contained in the cylinders 37 and 38, it is obvious that the piston 39 and its rod 40 will be elevated causing an upward movement of the arm 45 of the bell crank lever 46, causing the arm 48 of the bell crank lever 46 to move rearwardly with the result that the accelerator rod 49 is moved to open the throttle valve of the carburetor, against the action of the usual carburetor spring, not shown. By controlling the pressure on the toe end of the accelerator pedal 28', it will be obvious that the speed of the motor vehicle may be governed.

Should it be desired to apply the brake, it is only necessary to move the accelerator pedal bodily downwardly to the position as shown by Fig. 9 of the drawings, whereupon the brake lever 7' moves downwardly causing the short arm 9 thereof to move the piston rod 10 of the master cylinder of the conventional pneumatic braking system of the motor vehicle, applying the brakes.

Simultaneously with the downward movement of the forward end of the brake lever 7', the lever 14 is moved downwardly causing the forwardly extended arm 15 thereof to move upwardly which in turn moves the rod 19 upwardly causing the arm 21 to also swing upwardly. Since the arm 21 is secured to the shaft 22, it is obvious that the arm 26 which is also secured to the shaft 22, will swing upwardly pulling with it the piston rod 27 and the piston 28. As the piston 28 moves upwardly, a suction is created within the cylinders 37 and 38, which pulls the pistons 36 and 39 downwardly, operating the linkage connection between the pistons 36 and 39 and the accelerator pedal 28' and accelerator rod 49 respectively, in reverse, to immediately cut off the supply of gas to the engine by closing the throttle valve.

When pressure is relieved from the accelerator pedal 28', it is obvious that the spring 59 and the usual spring of the conventional carburetor, will return the brake lever 7' and accelerator rod 49 to the normal "off" position as shown by Fig. 7. To resume driving, the operator merely presses the toe portion of the accelerator pedal 28' downwardly which operates the rod 7 to move the linkage for feeding the gas to the engine to supply the fuel for normal running of the vehicle.

It might be further noted that because of the ball valve 53, the column of fluid passing from one cylinder to another, will be retarded to a degree to prevent the too sudden application of power to impair the smooth running of the vehicle.

In view of the foregoing detailed description of the construction and operation of the present invention, a further description as to the operation of the device is believed unnecessary.

Having thus described the invention, what is claimed is:

1. The combination with the accelerator rod, accelerator pedal and master cylinder of the hydraulic brake system of a motor vehicle, of a control means embodying a pivoted brake lever connected to the accelerator pedal effecting operation of the master cylinder, a cylinder block having a plurality of fluid-containing cylinders, communicating at their lower ends mounted on the vehicle, pistons operating in the cylinders, linkage connected between the accelerator pedal and one of said pistons operating the pistons as the accelerator pedal is tilted forwardly, linkage connected between one of said pistons and accelerator rod, operating the accelerator rod controlling the speed of the vehicle as the accelerator pedal is operated, and means including linkage connected between the brake lever and one of said cylinders operating said pistons simultaneously cutting off the flow of gas to the motor of the vehicle with the operation of the pedal braking the vehicle.

2. The combination with the accelerator rod, accelerator pedal and hydraulic brake master cylinder of a motor vehicle, of a control system embodying a pair of fluid-containing cylinders communicating at their lower ends in which pistons operate, mounted on the vehicle, linkage connecting one of the pistons with the accelerator rod, linkage connecting the other piston with said accelerator pedal whereby pressure on the accelerator pedal operates the pistons effecting throttle control, a third cylinder communicating with the pair of cylinders, a brake lever connected with the accelerator pedal and brake master cylinder, and linkage connected between the piston of the third cylinder and brake lever operating said piston operating in the third cylinder creating a suction in the pair of cylinders returning the accelerator rod and valve controlled thereby to normal motor idling position when said accelerator pedal is operated for effecting operation of the brake lever.

3. The combination with the accelerator rod, accelerator pedal and hydraulic brake master cylinder of a motor vehicle, of a control means comprising a cylinder block including a throttle cylinder, an accelerator cylinder, and a brake cylinder communicating at their lower ends, pistons operating in said cylinders, said cylinders containing fluid, linkage connecting the accelerator rod with said piston operating in said throttle cylinder, linkage connecting the accelerator pedal with the piston operating in said accelerator cylinder whereby said accelerator rod is operated under pressure directed to the throttle cylinder by fluid forced from the accelerator cylinder to said throttle cylinder, linkage connecting said accelerator pedal and piston operating in the brake cylinder, moving the piston in said brake cylinder creating a suction in the cylinders simultaneously operating the pistons effecting operation of the accelerator rod, cutting off the supply of gas.

4. The combination with the accelerator rod, accelerator pedal and hydraulic brake master cylinder of a motor vehicle, of a control system comprising a cylinder block including a plurality of parallel communicating cylinders containing fluid, means for securing said cylinder block to the floor board of a vehicle, pistons operating in said cylinders, linkage connecting one of the pistons to the accelerator rod, linkage providing a connection between one of said pistons and the accelerator pedal, said pistons operating said accelerator rod controlling the speed of operation of said vehicle, linkage connecting said accelerator pedal and piston operating in one of the cylinders, whereby pressure on said accelerator pedal effective during braking control operates the latter piston creating a suction in said first mentioned cylinders, simultaneously operating said accelerator rod, closing the throttle valve with the operation of the brake system.

5. The combination with the accelerator rod, accelerator pedal and hydraulic brake master cylinder of a motor vehicle, of a control system comprising a cylinder block having a plurality of communicating parallel cylinders communicating at their lower ends containing fluid, pistons operating in said cylinders, linkage connecting one of the pistons to the accelerator rod, linkage providing a connection between one of said pistons and the accelerator pedal, said pistons operating said accelerator rod controlling the speed of operation of said vehicle effective during tilting of said accelerator pedal or throttle control, linkage connecting said accelerator pedal and piston operating in one of the cylinders whereby pressure on said accelerator pedal effective during braking control operates the latter piston creating a suction in said first mentioned cylinders simultaneously operating said accelerator rod, closing the throttle valve with the operation of the brake system, and means for retarding passage of the fluid between the cylinders during the operation of the pistons.

6. The combination with the accelerator rod, accelerator pedal and master cylinder of the hydraulic brake system of a motor vehicle, of a control means including a cylinder block comprising a plurality of fluid-containing cylinders, pistons operating within the cylinders, linkage connected between one of the pistons and said accelerator rod effective during forward tilting of the accelerator pedal in operating the accelerator rod, controlling the speed of the vehicle, a brake lever connected with the accelerator pedal adjacent to the rear end thereof, means controlled by the movement of said lever effective during brake control operation for operating said master cylinder of the brake system, linkage connected between one of said cylinders and said brake lever effective in operating said pistons by movement of the accelerator pedal, said linkage connected with the brake lever providing a fulcrum for the brake lever, and yieldable means connected with the brake lever for holding said brake lever against effecting operation of the brakes under predetermined pressures.

7. The combination with an accelerator rod, accelerator pedal and master cylinder of the hydraulic brake system of a motor vehicle, of a control means including a cylinder block comprising a plurality of fluid containing cylinders, a passageway formed at the lower ends of the cylinders establishing communication between said cylinders, a ball valve having openings extending therethrough, through which fluid in the cylinders passes restricting movement of the fluid regulating the flow of fluid from one cylinder to the other, pistons operating within the cylinders, linkage connected between one of the pistons and said accelerator pedal effective during forward tilting of the accelerator pedal in operating the accelerator rod, controlling the speed of the vehicle, a brake lever connected with the accelerator pedal adjacent to the rear end thereof providing a support for the pedal, means controlled by the movement of said lever effective during brake control operation for operating said master cylinder of the brake system, linkage connected between one of said cylinders and said brake lever effective in operating said pistons by movement of the accelerator pedal, and yieldable means connected with the brake lever for normally holding said brake lever against effecting operation of the brake system under predetermined pressures.

MARSHALL P. DEPUTY.

REFERENCES CITED

The following references are of record in the file of this patent:

UNITED STATES PATENTS

| Number | Name | Date |
|---|---|---|
| 2,203,777 | Detmers | June 11, 1940 |
| 2,516,824 | Gossweiler | July 25, 1950 |